Figure 1:
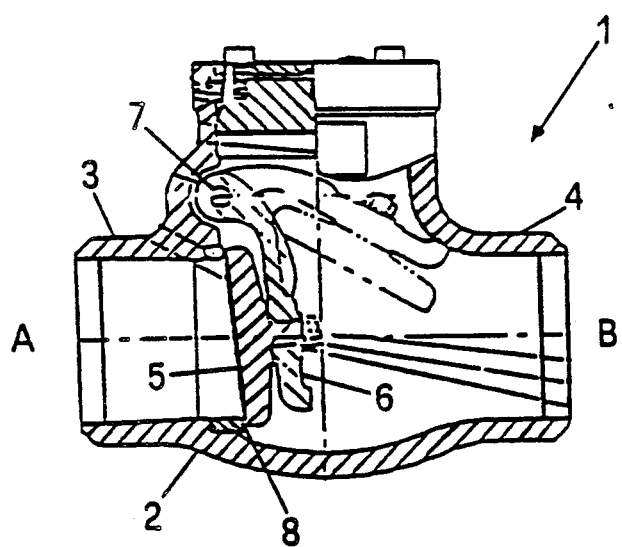

United States Patent [19]

Farello et al.

[11] Patent Number: 5,094,428
[45] Date of Patent: Mar. 10, 1992

[54] PASSIVELY ACTUATED VALVE

[75] Inventors: Giovanni E. Farello; Antonio Naviglio, both of Rome, Italy

[73] Assignee: Comitato Nazionale Per la Ricerca E per lo Sviluppo Dell'Energia Nucleare E Delle Energie Alternative, Rome, Italy

[21] Appl. No.: 515,753

[22] Filed: Apr. 30, 1990

[30] Foreign Application Priority Data

Apr. 28, 1989 [IT] Italy ............... 478899 A/89

[51] Int. Cl.⁵ ................ F16K 31/122; F16K 3/24
[52] U.S. Cl. ........................ 251/63; 251/338
[58] Field of Search ............. 251/62, 63, 338; 137/534

[56] References Cited

U.S. PATENT DOCUMENTS

| | | | |
|---|---|---|---|
| 1,153,973 | 9/1915 | Tacit et al. | 251/63 |
| 2,651,325 | 9/1953 | Lusignan, Jr. | 251/63 X |
| 3,004,551 | 10/1961 | Shafer | 251/63 X |
| 3,004,552 | 10/1961 | Shafer | 251/63 X |
| 3,159,378 | 12/1964 | Haag | 251/63 X |
| 4,308,887 | 1/1982 | van Bogaert | 137/534 X |
| 4,566,485 | 1/1986 | Ruhle | 137/534 X |

FOREIGN PATENT DOCUMENTS

| | | | |
|---|---|---|---|
| 42666 | 7/1930 | Denmark | 251/63 |
| 570125 | 4/1924 | France | 251/63 |
| 4444 | of 1896 | United Kingdom | 251/63 |
| 445704 | 4/1936 | United Kingdom | 251/63 |

Primary Examiner—John Rivell
Attorney, Agent, or Firm—Browdy and Neimark

[57] ABSTRACT

A valve comprises a valve body extending vertically, provided with an inlet conduit and an outlet conduit, at the interior of which there is located a suitable weighted shutter arranged for sliding in a guided manner between opening and closing positions for said conduits and to divide said valve body in an upper plenum chamber communicating with the sucking side of a pump and in a lower plenum chamber communicating with the delivery side of said pump.

3 Claims, 2 Drawing Sheets

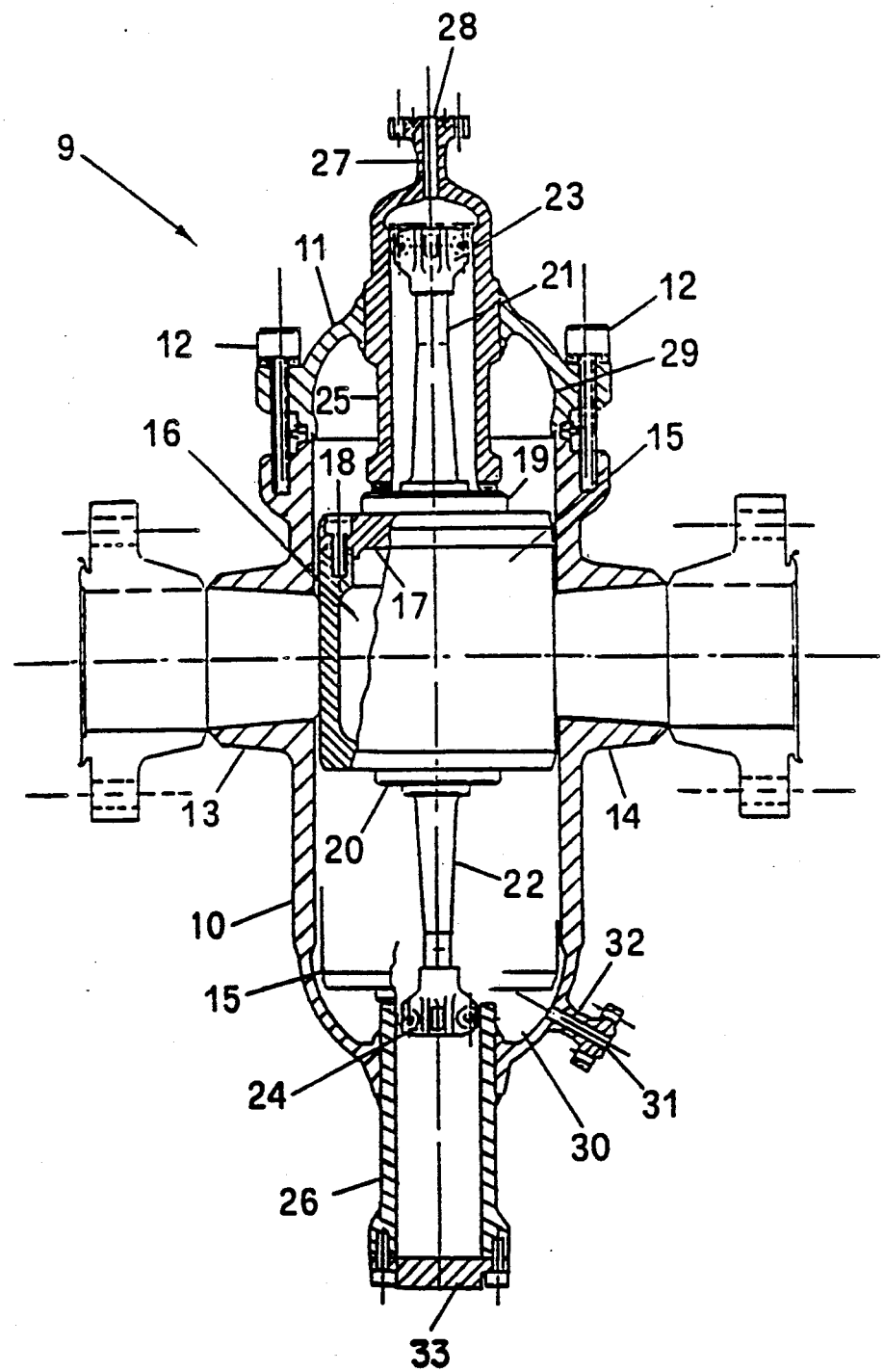

PASSIVELY ACTUATED VALVE

The present invention relates to a check valve the operation of which is of the passive kind, i.e. does not require for its opening the intervention of power pressures by the fluid passing through it and does not have members that could delay or even prevent its operation owing to seizures caused by corrosions, friction, and the like between the moving parts.

In several thermal and hydraulic applications, it is necessary the availability of check valves for the opening of which the effort to be made by the fluid that must go through in the desired sense be minimum or better non existing, and this for the purpose of not decreasing the available pressure with head losses, a matter that occurs in conventional check valves.

In the above said valves, moreover, there is very often the need of having the complete opening to flow through even before that the pressure difference between the inlet and outlet of the same be reduced to zero or inverted.

In FIG. 1 there is shown an example of a check or unidirectional valve, generally shown in 1, according to the prior art arranged for allowing the flow of a fluid from A towards B and for preventing said flow in the direction from B towards A.

The valve 1 is a valve with aligned components that includes essentially a valve body 2 comprising an inlet conduit 3 on the side A, an outlet conduit 4 on the side B and a shutter 5 arranged as a swinging plate, integral with an arm 6 pivoted in 7, arranged for moving between a closure position of the seat 8, in which it is shown in solid lines, and a position of opening of said seat, in which it is shown in dotted lines, thanks to the difference of the pressures of the fluid operating on its opposite sides.

The above described valve, like the other of the same kind according to the prior art, has, particularly in special applications, inconveniences that cannot be neglected, that will be brought into evidence hereinafter during the discussion of its operation.

When the pressure on the side B is greater than that existing on the side A, the beginning of a return motion from B towards A creates a fluido-dynamic action that adds to the force of gravity and makes the shutter 5 to approach the seat 8 closing in the desired way the valve. When, on the contrary, the pressure on the side A is greater than that on the side B, the following motion from A towards B may occur only when a marked difference between said pressures appears, whilst often, as for instance in high-risk plants, such as those employing either toxic or explosive fluid, the natural circulation is recurred to, that is characterized by low pressure differences.

The opening of the valve 1 in question requires a positive work by the fluid on the side A on the shutter 5 in order to lift it overcoming the gravitational forces and the friction forces of the shutter 5 itself. Said actuation entails a waste of energy by the fluid and is the cause of delays in the actuation towards opening, delays that often can not be allowed. Such a behaviour is particularly undesired when, for safety reasons, it is desired that as soon as the pressure difference is reduced to zero, the plant be immediately available for performing the circulation from A towards B and that there be no troubling element. Situations of this kind may appear in chemical plants where the reactions must be tightly controlled and where reliable interventions are required performed with operators of a simple mechanical nature avoiding complex instrumentations and complex electronic chains, owing to the risks of malfunctioning.

The presence of the hinge 7 that supports the shutter 5 and, still worse, the build-up of possible scales at its interior may entail, if not the seizure, an increase of the passive resistance to the opening, a situation that absolutely can not be permitted when one operates in the field of safety.

The geometrical shape of the seat 8 and of the shutter 5, as it appears from FIG. 1, can not be such as to minimize the head losses that undergoes the fluid in going through the valve 1 itself, whilst the ideal situation would be the complete elimination of any kind of fluidodynamic resistance when the valve is open. On the contrary, the loss of head, when the fluid has been able to displace the shutter, is appreciable in any kind of construction of this kind of valves because the coefficient of head loss has to be considered with low flow rates much higher than that referred to in the data sheets, where said coefficient is given for the valve in a fully opened condition; said condition occurs only with high flow rates when the hydraulic thrust is sufficient to guarantee the lifting of the shutter; on the contrary, at low flow rates, the thrust is moderate and the shutter rests in an intermediate position causing a decrease of the flow rate itself that can not be neglected.

The total loss of head in the valve in question of a conventional kind may be attributed both to the eddies that are created downstream of the seat and to the deviation of the fluid stream caused by the shutter.

With low flow rates of the fluid, such as those which are present in natural circulation fluid motions, the solutions that may be obtained with the check valves of the prior art can not be considered valid.

The present invention has been conceived with the aim of providing a check or on-off valve capable of excluding in the logics of intervention the possibility of seizures and the penalties deriving from the pressure drops previously referred to.

Consequently, an aim of the present invention is to provide a valve of the above said kind in which the effort performed by the fluid for the opening of the valve itself is non existent.

Another aim of the present invention is to provide a valve of the kind above mentioned capable of allowing a complete opening still before that the pressure drop through the valve itself is reduced to zero or inverted.

Still another aim of the present invention is to provide a valve of the above mentioned kind having a very simple structure in order to allow the maximum reliability of operation avoiding springs, levers, pivots, and the like, as well as any kind of positive actuation.

Still another aim of the present invention is to provide a valve of the above mentioned kind arranged so as to allow a loss of pressure practically non existing by the fluid that goes through it; this being a feature particularly important in chemical plants, nuclear plants, pharmaceutical plants, when safety problems are associated to check valves.

Still a further aim of the present invention is to provide a valve of the above mentioned kind suitable for performing the opening in a passive way, utilizing exclusively gravitational forces, since previously a work has been already performed from the exterior, stored as a potential energy available on a relatively heavy shutter, and in which the maintenance in the closed posi- The present invention will be better disclosed hereinafter from a disclosure of a preferred embodiment thereof, given only as a non-limiting example, and with reference to the attached drawings, wherein:

FIG. 1 is a sectional view of a kind of a check valve according to the prior art; and FIG. 2 is a sectional view of the check valve according to the invention.

With reference to FIG. 2, there is shown generally in 9 the check valve according to the present invention, that comprises a cylindrical body 10 extending vertically, open on its top, provided with a lead 11 having substantially the shape of a spherical shell, fastened in a removable manner on the upper opening of the body 10, by means of bolts 12.

From diametrically opposed sides of the body 10 there extend coaxially towards the exterior in an integral piece, in intermediate position, an inlet conduit 13 and an outlet conduit 14 for the fluid, where valve seats are machined on the respective outlet and inlet openings.

At the interior of the body 10 there is located a shutter 15 constituted of a cylindrical member, with an internal cavity 16 open at the top, provided with a closure cover 17 removably fastened by means of bolts 18, said cavity 16 being provided for receivinq a predetermined quantity of ballast, for instance inert materials, in order to give to the shutter 15 a desired additional weight as a function of the operational conditions. The shutter 15 has an external diameter slightly smaller than the internal diameter of the body 10 and is arranged for sliding from a lifted closing position, in which it blocks the communication between the inlet conduit 13 and the outlet conduit 14 abutting against said respective seats of these latters, and a lowered position in which it does not interfere with the communication between said two conduits, the shutter 15 in the mentioned position being shown in FIG. 2 in solid lines and in dotted lines, respectively.

For guiding the shutter 15 in its axial stroke at the interior of the body 10 so that, notwithstanding the thrust in an horizontal direction exerted thereon by the fluid, does not have sliding contacts with the internal wall of the body 10 itself, on the upper and lower flat faces of the shutter 15 there are fastened, in axially opposed position, respective circular plates 19 and 20 wherefrom respective rods 21 and 22 upper and lower extend centrally, each of which has the free end integral with a bearing 23 and 24, respectively, suitable for sliding at the interior of respective tubular guides 25 and 26, respectively upper and lower, that extend axially in the body 10, of which the first one is integrally supported by the lead 11 wherefrom it protrudes partially upwards, extending downwards up to the proximity of the plate 19, and the second one is integrally supported by the bottom wall of the body 10 wherefrom it protrudes almost entirely downwards.

From the closed top of the guide 25 there extends in a single piece upwards an upper extension 27, that is flanged, and that has an axial conduit 28 suitable for placing in communication the interior of the guide 25 with the suction side of a first pump (not shown), the lower end of the guide 26 being closed by a bolted stopper 33.

The shutter 15 divides the interior of the body 10 into an upper plenum chamber 29 communicating through the conduit 28 in the upper extension 27 with the pump, on its suction side, and in a lower plenum chamber 30, communicating with said pump, on the delivery side, through a conduit 31 axially formed with a lower extension 32, flanged, extending towards the exterior from the bottom of the body 10.

In the operation, when the pump is operating, the shutter 15 is kept in said lifted position corresponding to the closure of the valve, i.e. the one that is shown in full lines in FIG. 2, by the head of the pump, in communication with the upper plenum chamber 29 through the conduit 28 in the upper extension 27 while the lower plenum chamber is connected to the delivery side of the pump itself through the conduit 31 in the lower extension 32, creating in this way on the shutter 15 a pressure differential suitable for maintaining it in the position of closure of the communication between the inlet conduit 13 and the outlet conduit 14 of the valve 9.

The pump, besides maintaining the necessary negative pressure on the upper plenum 29, allows the flow of the fluid spilled in the place existing between said seats on said inlet and outlet conduits 13, 14 and the shutter 15; the spilled fluid, lost to the purpose of efficiency of the process, represents "the cost of the operation", that is, after all, very limited, and that is necessary for obtaining the safety performances of the valve according to the invention.

When the action of said pump is lacking, the gradual decrease of the head that appears during the stop transient, does not offer any more the necessary hydraulic thrust that is opposed to the weight of the shutter 15, and consequently starting from certain deliveries of the pump (or residual head) the descent of the same begins opening completely the opening of the inlet and outlet conduits 14 and 15 of the valve in order to give to the fluid the whole passage sectional area.

By selecting suitably the weight of the shutter 15, the differential thrust produced by the pump may be adjusted, and it is possible "to tailor" at will the moment in which the descent of the shutter 15 begins, moment, that obviously, may be referred also to the flow rate or residual pressure that one wants to have at the moment of opening of the valve.

In the nuclear field, and in particular for the Italian reactor MARS, it is required the connection motion in the safety branching at the moment in which the circulation pumps have reduced the flow rate to values near to 50 %. In the same it is also desired that the intervention of the associated branch does not require any complex actuation either with sensors or electromechanical actuators.

The valves of a conventional kind, as above said, are theoretically available for the starting of the opening only after that a zero counter pressure is overcome, when a determined thrust is available, produced by the natural circulation. This would be unacceptable by the supervising authorities.

In the opening position of the valve of the shutter 15, i.e. in the lowered position shown in dotted lines in FIG. 2, the shutter 15 itself is brought back in the closing position above mentioned by the action of said pump, the delivery side of which is connected, as above said, to the lower plenum chamber 30 through the conduit 31 in the lower extension 32, while the upper plenum chamber 29 is placed and then maintained under negative pressure by said pump by means of the conduit 28 in the upper extension 27.

It should be remarked that hereinbefore a valve has been disclosed in which the automatic operation entails the opening of the same. It will be obvious for a person skilled in the art to introduce modifications so that in place of the opening of the valve a closure of the same occurs in the automatic operation.

It will also be understood that a valve according to the invention may operate either as an on-off valve or as a check valve, according to how the pressure in the plenum chamber is managed (i.e. pump/s or a pressurized vessel). As a conclusion of the above, we summarize now the main features of the check valve with fluido-dynamic control according to the present invention:

the valve offers a complete opening independently from the flow rate of the fluid passing through it;

the head losses are the lowest possible and consequently particularly suitable for natural circulation motions;

the forces that maintain closed the valve 9 are produced by the head of pumps; and as a consequence also low pump heads allow the use of relatively heavy shutters. This allows to have at disposal for the opening gravitational forces that are relatively large with respect to the forces caused by internal frictions that could appear and that result, if present, markedly lower;

the actuation of the opening passes from the active control of the motion of the fluid to the control by gravitational forces;

the valve is not actuated by the work of the fluid but by potential energies that are stored "ready" during the operation by the opposition of pressure forces: it results therefrom that from the relative adjustment of the same it is possible to establish the moment in which the valve is opened, being the opening possible with time lead of an adjustable kind, causing, if necessary, the opening in advance with respect to the moment in which there appears the inversion of the pressures in the point.

The present invention is not limited to the described embodiment thereof, but encompasses any modification of the same.

We claim:

1. A valve operated in cooperation with the delivery and the suction sides of a fluid pump, said valve comprising;

a vertically elongated valve body closed at its top and its bottom and provided with an inlet conduit and an outlet conduit;

a shutter slidable between a lifted position in register with said inlet and outlet conduits in which it blocks the flow of fluid closing said conduits and a lowered position in which it completely opens said inlet and outlet conduits, said shutter dividing the interior of said valve body into an upper plenum chamber and in a lower plenum chamber;

said shutter having an internal cavity open at its top, said cavity closed by a closure lid fastened in a removable manner, said cavity being adapted to be filled with a ballast as so to impart to said shutter an appropriate weight as a function of the operative conditions, said shutter having guide means for enabling sliding of said shutter inside said valve body without any sliding contact between the peripheral external wall of said shutter and the peripheral internal wall of said valve body, said upper plenum chamber having means for communicating with the suction side of the pump and said lower plenum chamber having means for communicating with the delivery side of the pump, said shutter being passively actuated from said lifted position when the pump is operating to said lowered position by gravitational forces when the pump ceases to operate or reduces its delivery.

2. A valve according to claim 1, wherein said guide means comprises a first and a second rod having an end fastened to the upper and lower opposite faces of said shutter, respectively, and the other free end fastened to respective sliding members arranged for moving along respective tubular guides in said valve body.

3. A valve according to claim 2, wherein the diameter of said tubular guides is smaller than the diameter of said shutter.

* * * * *